United States Patent
Yamamoto

(10) Patent No.: US 11,591,014 B2
(45) Date of Patent: Feb. 28, 2023

(54) FOUR-WHEEL STEERING SYSTEM

(71) Applicant: JTEKT CORPORATION, Osaka (JP)

(72) Inventor: Yasuharu Yamamoto, Toyota (JP)

(73) Assignee: JTEKT CORPORATION, Kariya (JP)

( * ) Notice: Subject to any disclaimer, the term of this patent is extended or adjusted under 35 U.S.C. 154(b) by 983 days.

(21) Appl. No.: 16/376,048

(22) Filed: Apr. 5, 2019

(65) Prior Publication Data

US 2019/0315399 A1 Oct. 17, 2019

(30) Foreign Application Priority Data

Apr. 11, 2018 (JP) .............................. JP2018-076133

(51) Int. Cl.
| | | |
|---|---|---|
| *B62D 7/15* | (2006.01) | |
| *B62D 6/00* | (2006.01) | |
| *B62D 6/02* | (2006.01) | |
| *B62D 7/02* | (2006.01) | |

(52) U.S. Cl.
CPC ............ *B62D 7/1509* (2013.01); *B62D 6/002* (2013.01); *B62D 6/02* (2013.01); *B62D 7/026* (2013.01); *B62D 7/159* (2013.01)

(58) Field of Classification Search
CPC ...... B62D 7/1509; B62D 7/026; B62D 7/159; B62D 6/002; B62D 6/02
See application file for complete search history.

(56) References Cited

U.S. PATENT DOCUMENTS

| | | | | |
|---|---|---|---|---|
| 6,615,944 | B1 * | 9/2003 | Horwath | B62D 7/159 |
| | | | | 180/204 |
| 2002/0038171 | A1 | 3/2002 | Deguchi et al. | |
| 2003/0078711 | A1 * | 4/2003 | Klein | B62D 7/159 |
| | | | | 701/41 |

(Continued)

FOREIGN PATENT DOCUMENTS

| | | |
|---|---|---|
| JP | S61-181778 A | 8/1986 |
| JP | S62-137275 A | 6/1987 |

(Continued)

OTHER PUBLICATIONS

Sep. 6, 2019 Extended Search Report issued in European Patent Application No. 19168461.2.

(Continued)

*Primary Examiner* — Marc Burgess
*Assistant Examiner* — Michael E. Heins
(74) *Attorney, Agent, or Firm* — Oliff PLC

(57) ABSTRACT

The four-wheel steering system includes a front-wheel steering system that steers front wheels of a vehicle and a rear-wheel steering system that steers rear wheels of the vehicle in accordance with a steering angle that is a rotation angle of a steering wheel. The rear-wheel steering system includes a second ECU that, when the vehicle speed is equal to or lower than a vehicle speed threshold, performs anti-phase control in which the rear wheels are steered in the opposite direction to that in which the front wheels are steered. When the vehicle speed is equal to or lower than the (Continued)

vehicle speed threshold, the second ECU performs in-phase control in which the rear wheels are steered in the same direction as that in which the front wheels are steered, in response to a specific trigger operation that is performed via the steering wheel.

3 Claims, 13 Drawing Sheets

(56) References Cited

U.S. PATENT DOCUMENTS

| | | | |
|---|---|---|---|
| 2015/0307128 A1* | 10/2015 | Blond | B62D 5/20 |
| | | | 701/42 |
| 2018/0079447 A1* | 3/2018 | Yamashita | B62D 5/0469 |
| 2018/0229698 A1* | 8/2018 | Salmon | B60T 7/12 |
| 2018/0319439 A1* | 11/2018 | Richert | B62D 7/159 |
| 2019/0054950 A1* | 2/2019 | Farhat | G05D 1/0061 |
| 2019/0092380 A1* | 3/2019 | Miccinilli | B62D 15/024 |

FOREIGN PATENT DOCUMENTS

| | | |
|---|---|---|
| JP | H02-254061 A | 10/1990 |
| JP | 2008-074192 A | 4/2008 |

OTHER PUBLICATIONS

Mar. 22, 2022 Office Action issued in Japanese Patent Application No. 2018-076133.

* cited by examiner

FOUR-WHEEL STEERING SYSTEM

INCORPORATION BY REFERENCE

The disclosure of Japanese Patent Application No. 2018-076133 filed on Apr. 11, 2018 including the specification, drawings and abstract, is incorporated herein by reference in its entirety.

BACKGROUND OF THE INVENTION

1. Field of the Invention

The invention relates to four-wheel steering systems.

2. Description of the Related Art

As described in, e.g., Japanese Patent Application Publication No. H02-254061 (JP H02-254061 A), four-wheel steering systems that steer not only front wheels but also rear wheels of a vehicle in accordance with operation of a steering wheel are conventionally known in the art. When the vehicle moves at low speeds, the four-wheel steering system steers the rear wheels in the opposite direction to that in which the front wheels are steered in accordance with the steering angle of the steering wheel. This allows the driver to turn the vehicle with a smaller turning radius when, e.g., maneuvering the vehicle in a parking lot.

When a vehicle equipped with a four-wheel steering system turns while moving at low speeds, the rear wheels are steered in the opposite direction to that in which the front wheels are steered. The overall turning radius of the vehicle is therefore smaller than that of a two-wheel steering vehicle. However, the rear part of the vehicle moves more outward of the turn in the early stage of the turn as compared to a two-wheel steering vehicle. Accordingly, when the vehicle parked along an obstacle such as a wall starts to move, the rear part of the vehicle moves outward of the turn in the early stage of the turn. There is therefore a risk that, e.g., a corner of the rear end of the vehicle may contact the obstacle.

In the four-wheel steering system described in JP H02-254061 A, touch sensors are mounted on outer side surfaces of the rear part of the vehicle. When the touch sensor detects contact between the vehicle and an obstacle, the rear wheels are returned to a steering neutral position or steered in the same direction as that in which the front wheels are steered. Accordingly, in the case where the rear part of the vehicle moves outward of a turn in the early stage of the turn at the time the vehicle starts to move, the rear part of the vehicle does not move outward of the turn anymore after the vehicle contacts the obstacle. This can minimize damage to the vehicle which is caused when the rear part of the vehicle contacts an obstacle as the rear part of the vehicle moves outward of a turn at the time the vehicle starts to move etc.

However, the four-wheel steering system of JP H02-254061 A merely restrains the rear part of the vehicle from moving further outward of the turn after the rear part of the vehicle contacts an obstacle and does not restrain the rear part of the vehicle from contacting an obstacle. Moreover, in the four-wheel steering system of JP H02-254061 A, the vehicle needs to be equipped with the touch sensors that detect contact between the vehicle and an obstacle.

SUMMARY OF THE INVENTION

It is one object of the invention to provide a four-wheel steering system capable of restraining a vehicle from contacting an obstacle while turning at the time the vehicle starts to move and also capable of simplifying the configuration of the vehicle.

According to one aspect of the invention, a four-wheel steering system includes: a front-wheel steering system that steers front wheels of a vehicle; and a rear-wheel steering system that steers rear wheels of the vehicle in accordance with a steering angle that is a rotation angle of a steering wheel. The rear-wheel steering system includes a control device that, when a vehicle speed is equal to or lower than a vehicle speed threshold, performs antiphase control in which the rear wheels are steered in an opposite direction to that in which the front wheels are steered. When the vehicle speed is equal to or lower than the vehicle speed threshold, the control device performs in-phase control in which the rear wheels are steered in the same direction as that in which the front wheels are steered, in response to a specific trigger operation that is performed via the steering wheel.

For example, when a vehicle parked along an obstacle such as a wall starts to move, a rear part of the vehicle moves outward of a turn in the early stage of the turn. There is therefore a risk that a corner of a rear end of the vehicle may contact the obstacle. In this situation, if the driver does not want the rear part of the vehicle to move outward of the turn when starting the vehicle, he or she can perform a trigger operation via the steering wheel to switch a steering control mode for the rear wheels from the antiphase control, which is set as a default steering control mode, to the in-phase control. Since the rear wheels are steered in the same direction as that in which the front wheels are steered, the vehicle can move in a direction away from the obstacle without turning. The corner of the rear part of the vehicle is thus restrained from contacting the obstacle such as a wall when the vehicle parked along the obstacle starts to move etc. The driver determines whether the steering control mode for the rear wheels needs to be switched when starting the vehicle. Accordingly, the vehicle need not have a special configuration such as a sensor for detecting the situation around the vehicle, and the configuration of the vehicle can be simplified accordingly.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
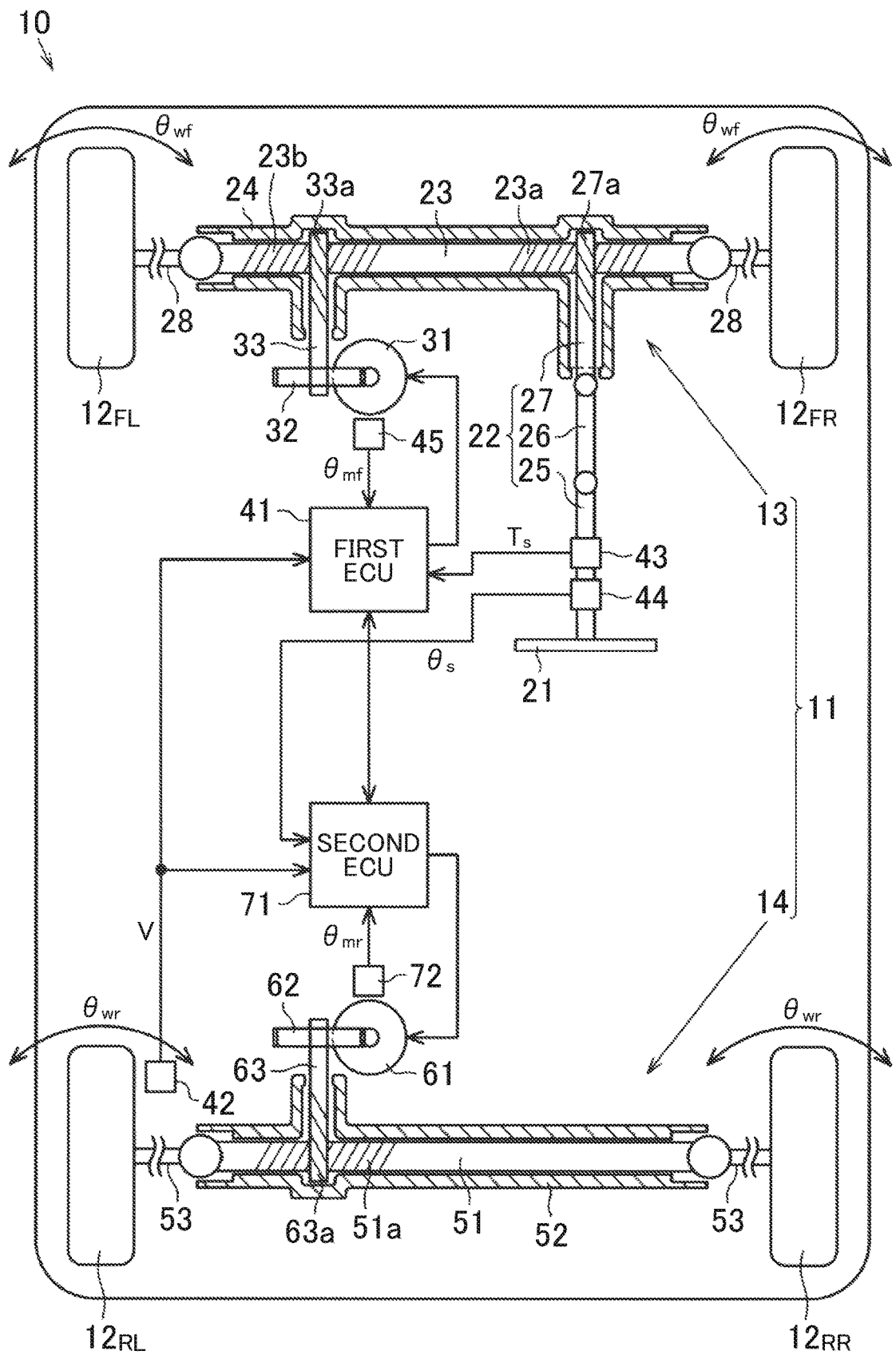
FIG. 1 is a schematic configuration diagram of a first embodiment of a four-wheel steering system.

A first embodiment of a four-wheel steering system of the invention will be described below. As shown in FIG. 1, a vehicle 10 is equipped with a four-wheel steering system 11. The four-wheel steering system 11 has a front-wheel steering system 13 that steers front wheels $12_{FR}$, $12_{FL}$ and a rear-wheel steering system 14 that steers rear wheels $12_{RR}$, $12_{RL}$.

The front-wheel steering system 13 has a steering shaft 22 to which a steering wheel 21 is coupled, a steered shaft 23 extending in the lateral direction of the vehicle 10 (the horizontal direction in FIG. 1), and a housing 24 accommodating the steered shaft 23 so that the steered shaft 23 can reciprocate therein. The steering shaft 22 is formed by a column shaft 25, an intermediate shaft 26, and a pinion shaft 27 which are coupled together in this order from the steering wheel 21 side. The pinion shaft 27 crosses the steered shaft 23. Pinion teeth 27a of the pinion shaft 27 mesh with rack teeth 23a of the steered shaft 23. The right and left front wheels $12_{FR}$, $12_{FL}$ are coupled to respective ends of the steered shaft 23 via tie rods 28 and knuckles, not shown. As the steering wheel 21 is turned, the steered shaft 23 moves linearly, whereby the steered angle $\theta_{wf}$ of the front wheels $12_{FR}$, $12_{FL}$ is changed.

The front-wheel steering system 13 has a motor 31, a reduction gear mechanism 32, and a pinion shaft 33 as a configuration that assists the driver in operating the steering wheel 21. The motor 31 is a source of a steering assist force (assist force). A three-phase brushless motor is used as the motor 31. A rotary shaft of the motor 31 is coupled to the pinion shaft 33 via the reduction gear mechanism 32. Pinion teeth 33a of the pinion shaft 33 mesh with rack teeth 23b of the steered shaft 23. Torque of the motor 31 is applied as a steering assist force to the steered shaft 23 via the pinion shaft 33. The steered shaft 23 moves in the lateral direction of the vehicle 10 with rotation of the motor 31.

The front-wheel steering system 13 has a first electronic control unit (ECU) 41. The first ECU 41 controls the motor 31 based on the detection results of various sensors mounted on the vehicle 10. The sensors include a vehicle speed sensor 42, a torque sensor 43, and a rotation angle sensor 45. The vehicle speed sensor 42 detects the vehicle speed V. The torque sensor 43 is mounted on the column shaft 25. The torque sensor 43 detects steering torque $T_s$ applied to the steering shaft 22 via the steering wheel 21. The rotation angle sensor 45 is mounted on the motor 31. The rotation angle sensor 45 detects the rotation angle $\theta_{mf}$ of the motor 31.

The first ECU 41 controls the motor 31 based on the vehicle speed V, the steering torque $T_s$, and the rotation angle $\theta_{mf}$ of the motor 31 which are detected by these sensors. The first ECU 41 calculates target assist torque based on the steering torque $T_s$ and the vehicle speed V and calculates a current command value based on the calculated target assist torque. The target assist torque is a target value of a rotational force (torque) to be generated by the motor 31. The current command value is a target value of a current to be supplied to the motor 31 in order to cause the motor 31 to generate the target assist torque. The first ECU 41 performs current feedback control in accordance with the rotation angle $\theta_{mf}$ of the motor 31 so that an actual current value that is supplied to the motor 31 follows the current command value. That is, the first ECU 41 calculates the deviation between the current command value and the actual current value and controls power supply to the motor 31 so as to eliminate the deviation. The first ECU 41 detects an actual current value that is supplied to the motor 31 by a current sensor disposed on a power supply path to the motor 31.

The rear-wheel steering system 14 has a steered shaft 51 extending in the lateral direction of the vehicle 10 (the horizontal direction in FIG. 1) and a housing 52 accommodating the steered shaft 51 so that the steered shaft 51 can reciprocate therein. The right and left rear wheels $12_{RR}$, $12_{RL}$ are coupled to respective ends of the steered shaft 51 via tie rods 53 and knuckles, not shown. The rear-wheel steering system 14 has a motor 61, a reduction gear mechanism 62, and a pinion shaft 63 as a configuration that applies a steering force, namely power for steering the rear wheels $12_{RR}$, $12_{RL}$, to the steered shaft 51. The motor 61 is a source of the steering force. A three-phase brushless motor is used as the motor 61. A rotary shaft of the motor 61 is coupled to the pinion shaft 63 via the reduction gear mechanism 62. Pinion teeth 63a of the pinion shaft 63 mesh with rack teeth 51a of the steered shaft 51. Torque of the motor 61 is applied as a steering force to the steered shaft 51 via the pinion shaft 63. The steered shaft 51 thus moves linearly in the lateral direction of the vehicle 10 with rotation of the motor 61, whereby the steered angle $\theta_{wr}$ of the rear wheels $12_{RR}$, $12_{RL}$ is changed.

The rear-wheel steering system 14 has a second ECU 71. The second ECU 71 controls the motor 61 based on the vehicle speed V, the steering angle $\theta_s$, and the rotation angle $\theta_{mr}$ of the motor 61. The steering angle $\theta_s$ is a rotation angle of the steering shaft 22 and is detected by a steering angle sensor 44. The steering angle sensor 44 is mounted between the steering wheel 21 and the torque sensor 43 on the column shaft 25. The rotation angle $\theta_{mr}$ of the motor 61 is detected by a rotation angle sensor 72 mounted on the motor 61.

The second ECU 71 calculates a target steered angle of the rear wheels $12_{RR}$, $12_{RL}$ based on the steering angle $\theta_s$ and the vehicle speed V. The second ECU 71 performs feedback control of the steered angle $\theta_{wr}$ in accordance with the rotation angle $\theta_{mr}$ of the motor 31 so that the actual steered angle $\theta_{wr}$ of the rear wheels $12_{RR}$, $12_{RL}$ follows the target steered angle. That is, the second ECU 71 calculates the deviation between the target steered angle and the actual steered angle $\theta_{wr}$ and controls power supply to the motor 61 so as to eliminate the deviation. The actual steered angle $\theta_{wr}$ of the rear wheels $12_{RR}$, $12_{RL}$ can be calculated based on the rotation angle $\theta_{mr}$ of the motor 61 which is detected by the rotation angle sensor 72. This is because there is a correlation between the rotation angle $\theta_{mr}$ of the motor 61 and the displacement of the steered shaft 51.

Figure 2A:
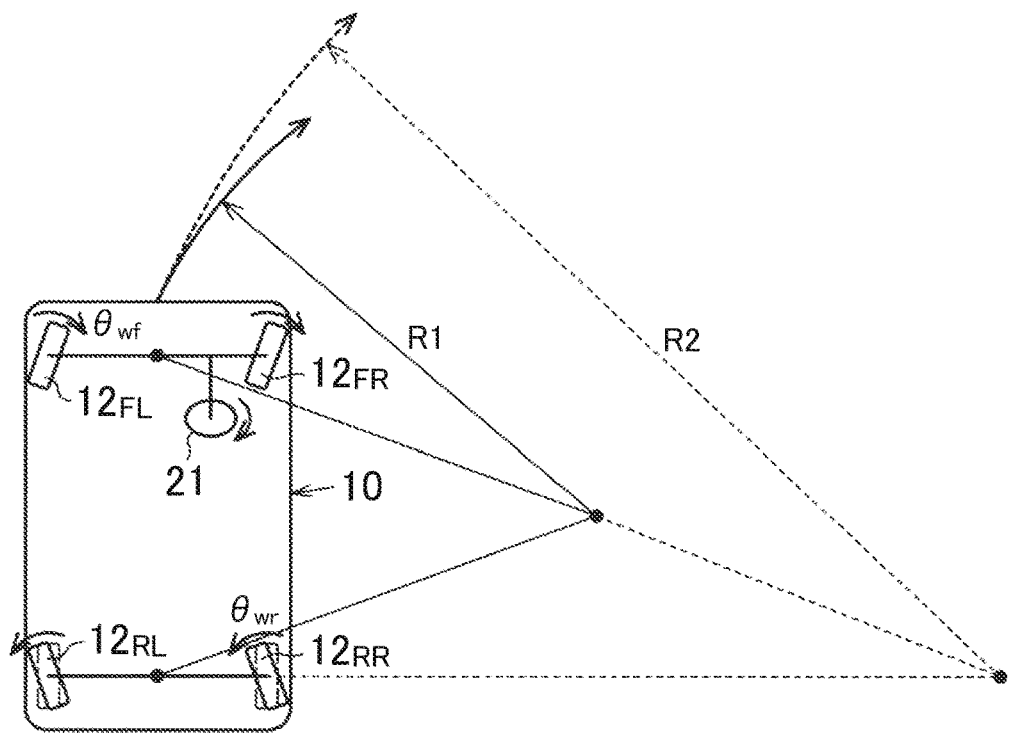
FIG. 2A is a plan view of a vehicle showing the phase relationship (antiphase) between front and rear wheels in the first embodiment.

When the vehicle speed V is in a low speed range equal to or lower than a vehicle speed threshold, the second ECU 71 performs antiphase control to steer the rear wheels $12_{RR}$, $12_{RL}$ in the opposite direction (antiphase) to that in which the front wheels $12_{FR}$, $12_{FL}$ are steered. As shown in FIG. 2A, since the steered angle $\theta_{wr}$ of the rear wheels $12_{RR}$, $12_{RL}$ is in antiphase with the steered angle $\theta_{wf}$ of the front wheels $12_{FR}$, $12_{FL}$, the overall turning radius R1 of the vehicle 10 is smaller than the turning radius R2 in the case where the vehicle 10 is a two-wheel steering vehicle (in the case where the direction in which the rear wheels $12_{RR}$, $12_{RL}$ are steered is kept in such a direction that the vehicle 10 moves straight). The vehicle 10 therefore has improved maneuverability with a small turning radius.

Figure 2B:
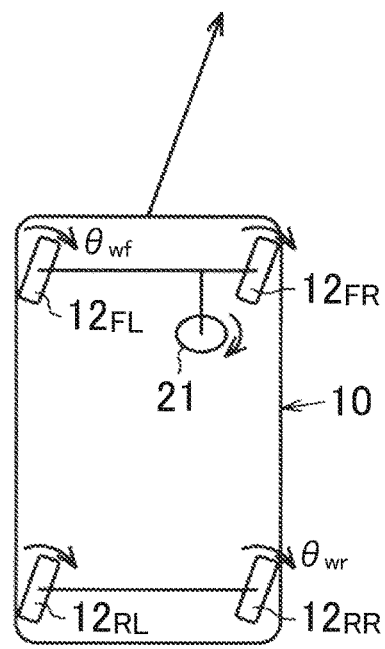
FIG. 2B is a plan view of a vehicle showing the phase relationship (in phase) between front and rear wheels in the first embodiment.

When the vehicle speed V is in a medium to high speed range higher than the vehicle speed threshold, the second ECU 71 performs in-phase control to steer the rear wheels $12_{RR}$, $12_{RF}$ in the same direction (in phase) as that in which the front wheels $12_{FR}$, $12_{FL}$ are steered. Since the steered angle $\theta_{wr}$ of the rear wheels $12_{RR}$, $12_{RL}$ is in phase with the steered angle $\theta_{wf}$ of the front wheels $12_{FR}$, $12_{FL}$ as shown in FIG. 2B, this provides driving stability when making lane changes or turning corners. In the case where the steered angle $\theta_{wr}$ of the rear wheels $12_{RR}$, $12_{RF}$ is set to the same angle as the steered angle $\theta_{wf}$ of the front wheels $12_{FR}$, $12_{FL}$, this allows the vehicle 10 to move obliquely, parallel to the direction in which the rear wheels $12_{RR}$, $12_{RF}$ and the front wheels $12_{FR}$, $12_{FL}$ are steered.

Figure 6A:
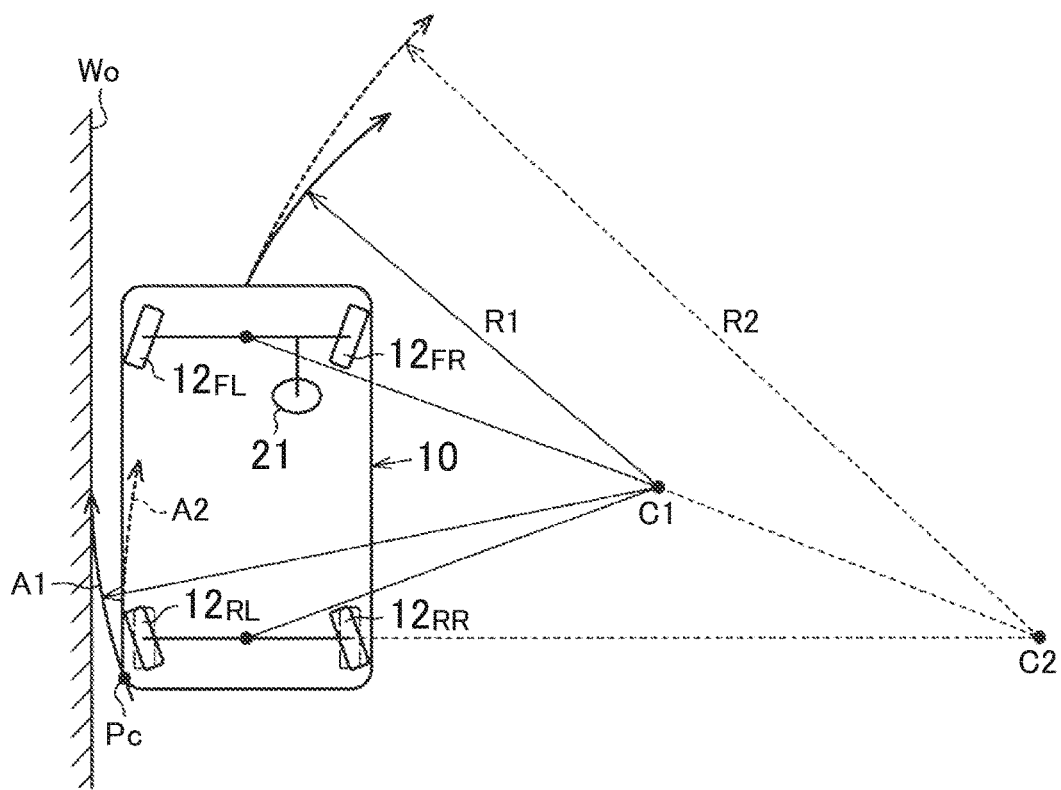
FIG. 6A is a plan view showing turning characteristics of a vehicle in a comparative example.

As shown in FIG. 6A, in the case where the vehicle 10 is a four-wheel steering vehicle, the rear wheels $12_{RR}$, $12_{RF}$ are steered in the opposite direction to that in which the front wheels $12_{FR}$, $12_{FL}$ are steered, when the vehicle 10 turns. In this case, the overall turning radius R1 of the vehicle 10 is smaller than the turning radius R2 in the case where the vehicle 10 is a two-wheel steering vehicle. However, the rear part of the vehicle 10 moves more outward of the turn in the early stage of the turn as compared to the case where the vehicle 10 is a two-wheel steering vehicle.

That is, in the case where the vehicle 10 is a two-wheel steering vehicle in which the direction in which the rear wheels $12_{RR}$, $12_{RF}$ are steered is kept in such a direction that the vehicle 10 moves straight, the vehicle 10 turns about the turning center C2 of the two-wheel steering vehicle with a corner Pc of the rear end of the vehicle 10 (e.g., a corner of a rear bumper) moving along a path in the direction in which the rear wheels $12_{RR}$, $12_{RF}$ are steered, as shown by dashed arrow A2 in FIG. 6A. The corner Pc of the rear end of the vehicle 10 therefore does not move outward of the turn with respect to an outer side surface of the vehicle 10 which is an outer side surface in the case where the vehicle 10 moves straight.

However, in the case where the vehicle 10 is a four-wheel steering vehicle, the vehicle 10 turns about the turning center C1 of the four-wheel steering vehicle with the corner Pc of the rear end of the vehicle 10 moving along a path in the direction in which the rear wheels $12_{RR}$, $12_{RF}$ are steered, namely in the direction in antiphase with that in which the front wheels $12_{FR}$, $12_{FL}$ are steered, as shown by continuous arrow A1 in FIG. 6A. In the early stage of the turn, the corner Pc of the rear end of the vehicle 10 therefore moves outward of the turn with respect to an outer side surface of the vehicle 10 which is an outer side surface in the case where the vehicle 10 moves straight.

Accordingly, when the vehicle 10 parked along an obstacle Wo such as a wall starts to move, the rear part of the vehicle 10 moves outward of a turn in the early stage of the turn. There is therefore a risk that the corner Pc of the rear end of the vehicle 10 may contact the obstacle Wo. The larger the steered angle $\theta_{WT}$ of the rear wheels $12_{RR}$, $12_{RF}$ is, the more this is likely to occur. This is because the larger the steered angle $\theta_{WT}$ of the rear wheels $12_{RR}$, $12_{RF}$ is, the smaller the turning radius of the vehicle 10 is and the more the rear part of the vehicle 10 moves outward of the turn.

In order to restrain contact between the rear part of the vehicle 10 and an obstacle Wo which is caused when the rear part of the vehicle 10 moves outward of a turn at the time the vehicle starts to move etc., the second ECU 71 controls steering of the rear wheels $12_{RR}$, $12_{RL}$ as follows. When the vehicle speed V is in the low speed range, the second ECU 71 switches the steering control mode for the rear wheels $12_{RR}$, $12_{RF}$ from antiphase control, which is set as a default control mode (standard control mode) for low vehicle speeds, to in-phase control, in response to a trigger operation that is performed by the driver via the steering wheel 21.

A process of switching the steering control mode for the rear wheels $12_{RR}$, $12_{RF}$ by the second ECU 71 will be described. As described above, the antiphase control is set as a default rear wheel steering control mode for low vehicle speeds.

Figure 3:
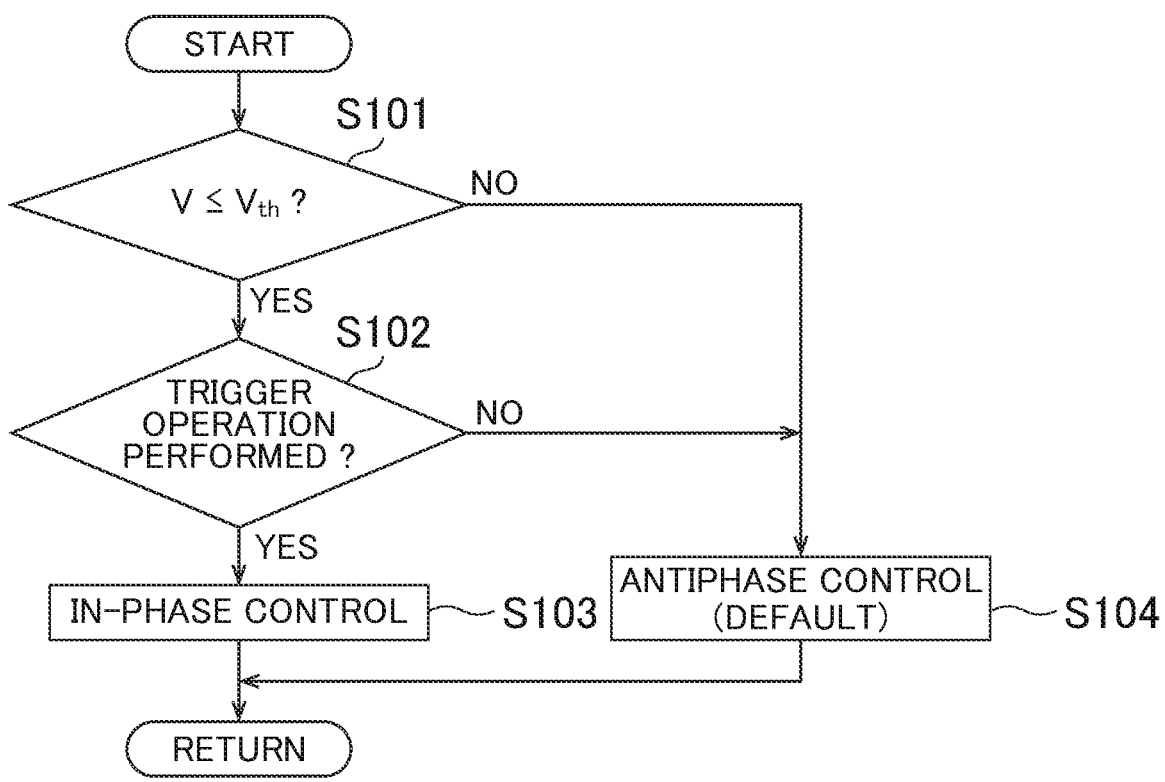
FIG. 3 is a flowchart (main routine) of a process of switching a steering control mode for rear wheels when a vehicle moves at low speeds in the first embodiment.

As shown in the flowchart of FIG. 3, the second ECU 71 determines whether the vehicle speed V is equal to or lower than a vehicle speed threshold $V_{th}$ (step S101). If the second ECU 71 determines that the vehicle speed V is equal to or lower than the vehicle speed threshold $V_{th}$ (YES in step S101), the routine proceeds to step S102.

In step S102, the second ECU 71 determines whether a trigger operation has been performed via the steering wheel 21. If the second ECU 71 determines that a trigger operation has been performed via the steering wheel 21 (YES in step S102), it performs the in-phase control of the rear wheels $12_{RR}$, $12_{RL}$ instead of the antiphase control of the rear wheels $12_{RR}$, $12_{RL}$ which is set as a default control mode for low vehicle speeds (step S103).

If the second ECU 71 determines in step S101 that the vehicle speed V is not equal to or lower than the vehicle speed threshold $V_{th}$ (NO in step S101), it performs the antiphase control of the rear wheels $12_{RR}$, $12_{RL}$ which is set as a default control mode for low vehicle speeds (step S104). If the second ECU 71 determines in step S102 that no trigger operation has been performed via the steering wheel 21 (NO in step S102), it also performs the antiphase control of the rear wheels $12_{RR}$, $12_{RL}$ (step S104).

A process of determining whether a trigger operation has been performed will be described. This process is performed as a subroutine in the main routine of the process of switching the steering control mode for the rear wheels when the routine proceeds to step S102 in the flowchart of FIG. 3.

Figure 4:
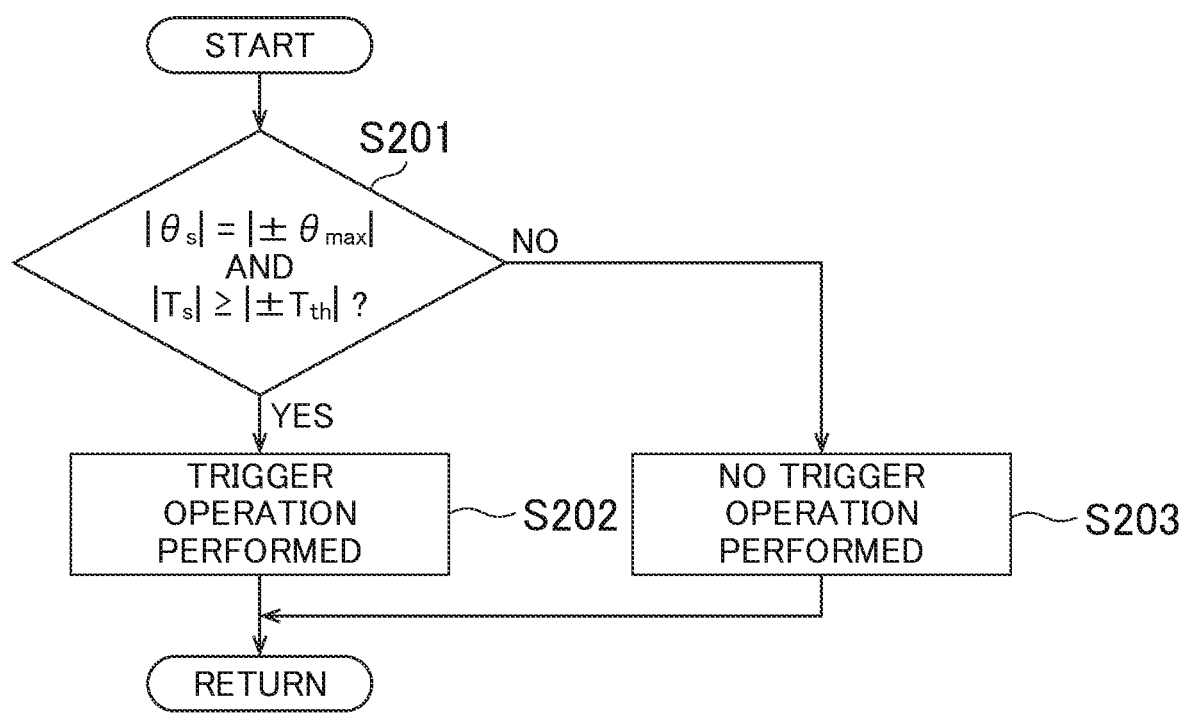
FIG. 4 is a flowchart (subroutine) of a process of determining whether a trigger operation has been performed in the first embodiment.

As shown in the flowchart of FIG. 4, the second ECU 71 determines whether the absolute value of the steering angle $\theta_s$ is equal to the absolute value of limit steering angles $\pm\theta_{max}$ and the absolute value of the steering torque $T_s$ is equal to or larger than the absolute value of torque thresholds $\pm T_{th}$ (step S201).

The limit steering angles $\pm\theta_{max}$ are steering angles $\theta_s$ at which the steering wheel 21 reaches a limit position in its physical operation range. For example, the limit steering angles $\pm\theta_{max}$ are determined by the steering angle $\theta_s$ at which the steered shaft 23 reaches a limit position in its physical movable range (the position where an end of the steered shaft 23 contacts the housing 24).

The torque thresholds $\pm T_{th}$ are set based on the steering torque $T_s$ that is applied when the steering wheel 21 turned until the absolute value of the steering angle $\theta_s$ becomes equal to the absolute value of the limit steering angles $\pm\theta_{max}$ is further turned by the driver by a predetermined amount in such a direction that the absolute value of the steering angle $\theta_s$ increases. This is in order to allow the second ECU 71 to determine whether the trigger operation via the steering wheel 21 is driver's intended trigger operation.

Figure 5:
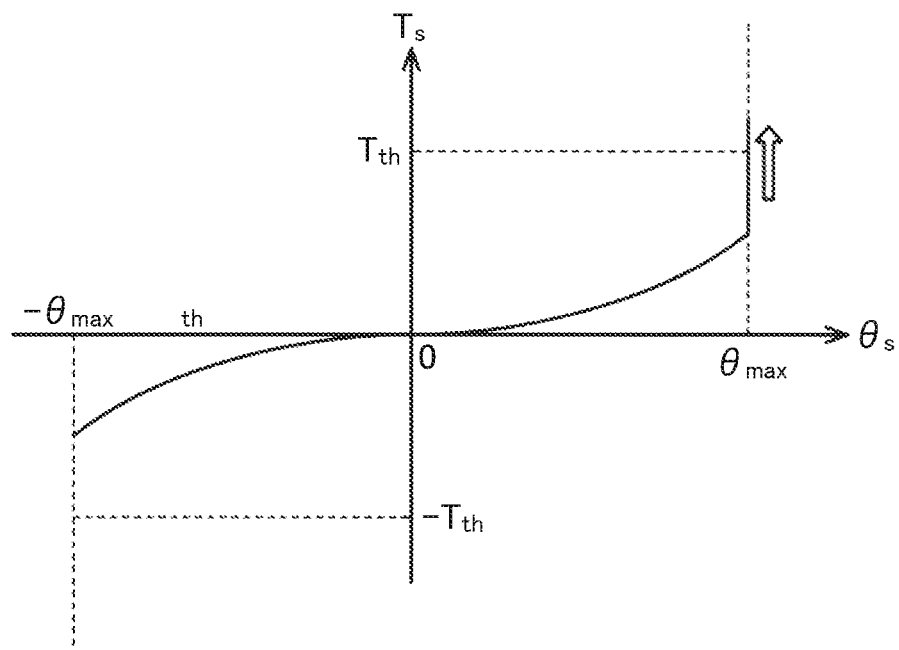
FIG. 5 is a graph showing the relationship between the steering angle and the steering torque in the first embodiment.

As shown in the graph of FIG. 5, if the second ECU 71 determines in step S201 that the absolute value of the steering angle $\theta_s$ is equal to the absolute value of the limit steering angles $\pm\theta_{max}$ (in FIG. 5, the limit steering angle $\theta_{max}$) and the absolute value of the steering torque $T_s$ is equal to or larger than the absolute value of the torque thresholds $\pm T_{th}$ (YES in step S201), the routine proceeds to step S202. In step S202, the second ECU 21 confirms the determination result that a trigger operation has been performed via the steering wheel 21 and returns the confirmed determination result to the main routine shown in the flowchart of FIG. 3 (RETURN).

If the second ECU 71 determines in step S201 that at least one of the condition that the absolute value of the steering angle $\theta_s$ is equal to the absolute value of the limit steering angles $\pm\theta_{max}$ and the condition that the absolute value of the steering torque $T_s$ is equal to or larger than the absolute value of the torque thresholds $\pm T_{th}$ is not satisfied (NO in step S201), the routine proceeds to step S203. In other words, if the second ECU 71 determines in step S201 that the absolute value of the steering angle $\theta_s$ is smaller than the absolute value of the limit steering angles $\pm\theta_{max}$ or the absolute value of the steering torque $T_s$ is smaller than the absolute value of the torque thresholds $\pm T_{th}$, the routine proceeds to step S203. In step S203, the second ECU 71 confirms the determination result that no trigger operation has been performed via the steering wheel 21 and returns the confirmed determination result to the main routine shown in the flowchart of FIG. 3 (RETURN).

The functions of the present embodiment which are obtained by switching the steering control mode for the rear wheels in response to a trigger operation when the vehicle 10 starts to move etc. will be described.

Figure 6B:
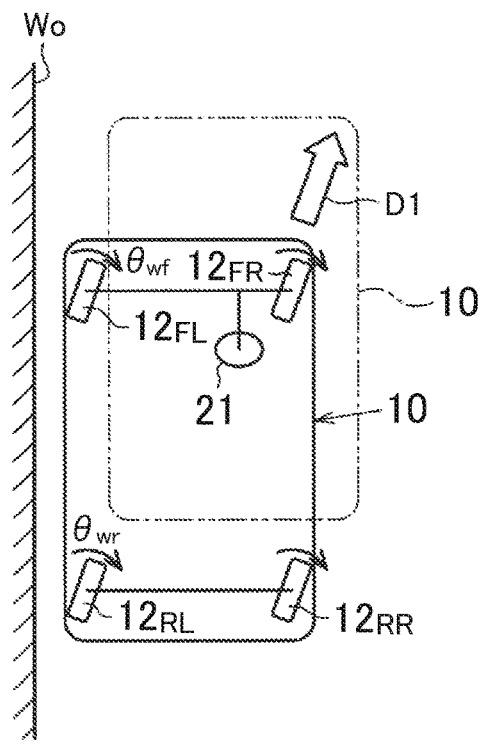
FIG. 6B is a plan view showing turning characteristics of a vehicle in the first embodiment.

As shown in FIG. 6B, when the driver starts the vehicle 10 parked along an obstacle Wo such as a wall, he or she can perform by his/her own decision a trigger operation via the steering wheel 21 to switch the steering control mode for the rear wheels.

It is herein assumed that the antiphase control that is set as a default rear wheel steering control mode for the low speed range is performed based on the distance between the obstacle Wo and the vehicle 10 etc. In this case, if it is determined that there is a risk that the corner Pc of the rear end of the vehicle 10 may contact the obstacle Wo as the corner Pc moves outward of the turn, the driver can perform a trigger operation via the steering wheel 21. As a trigger operation, the driver turns the steering wheel 21 to the limit position in its physical operation range and further applies the steering torque to the steering wheel 21 in such a direction that the absolute value of the steering angle $\theta_s$ increases.

The steering control mode for the rear wheels $12_{RR}$, $12_{RL}$ is switched from the default antiphase control to the in-phase control in response to this trigger operation. As a result, as shown by arrow D1 in FIG. 6B, the vehicle 10 moves obliquely forward so as to move away from the obstacle Wo in accordance with the steered angle $\theta_{wf}$ of the front wheels $12_{FR}$, $12_{FL}$ and the steered angle $\theta_{wr}$ of the rear wheels $12_{RR}$, $12_{RL}$. Since the vehicle 10 moves without turning, the corner Pc of the rear end of the vehicle 10 does not move outward of the turn. The corner Pc of the rear end of the vehicle 10 is therefore restrained from contacting the obstacle Wo.

The first embodiment has the following effects.

(1) If the driver does not want the rear part of the vehicle 10 to move outward of a turn when starting the vehicle 10, he or she can perform a trigger operation via the steering wheel 21 to switch the steering control mode for the rear wheels $12_{RR}$, $12_{RL}$ from the default antiphase control to the in-phase control. As a result, the vehicle 10 moves without turning.

(2) The driver determines in view of the situation around the vehicle 10 if the steering control mode for the rear wheels needs to be switched when starting the vehicle 10. Accordingly, the vehicle 10 need not have a special configuration such as a sensor for detecting the situation around the vehicle 10, and the configuration of the vehicle 10 can be simplified accordingly.

(3) When the vehicle speed V is lower than the vehicle speed threshold $V_{th}$, the second ECU 71 determines that a specific trigger operation has been performed, if the absolute value of the steering angle $\theta_s$ is equal to the absolute value of the limit steering angles $\pm\theta_{max}$ and the absolute value of the steering torque $T_s$ is equal to or larger than the absolute value of the torque thresholds $\pm T_{th}$. Accordingly, the driver can easily perform the specific trigger operation by operating the steering wheel 21.

A second embodiment of the four-wheel steering system will be described. The present embodiment basically has a configuration similar to that of the first embodiment shown in FIG. 1. The present embodiment is different from the first embodiment in the process of determining whether a trigger operation has been performed.

Figure 7:
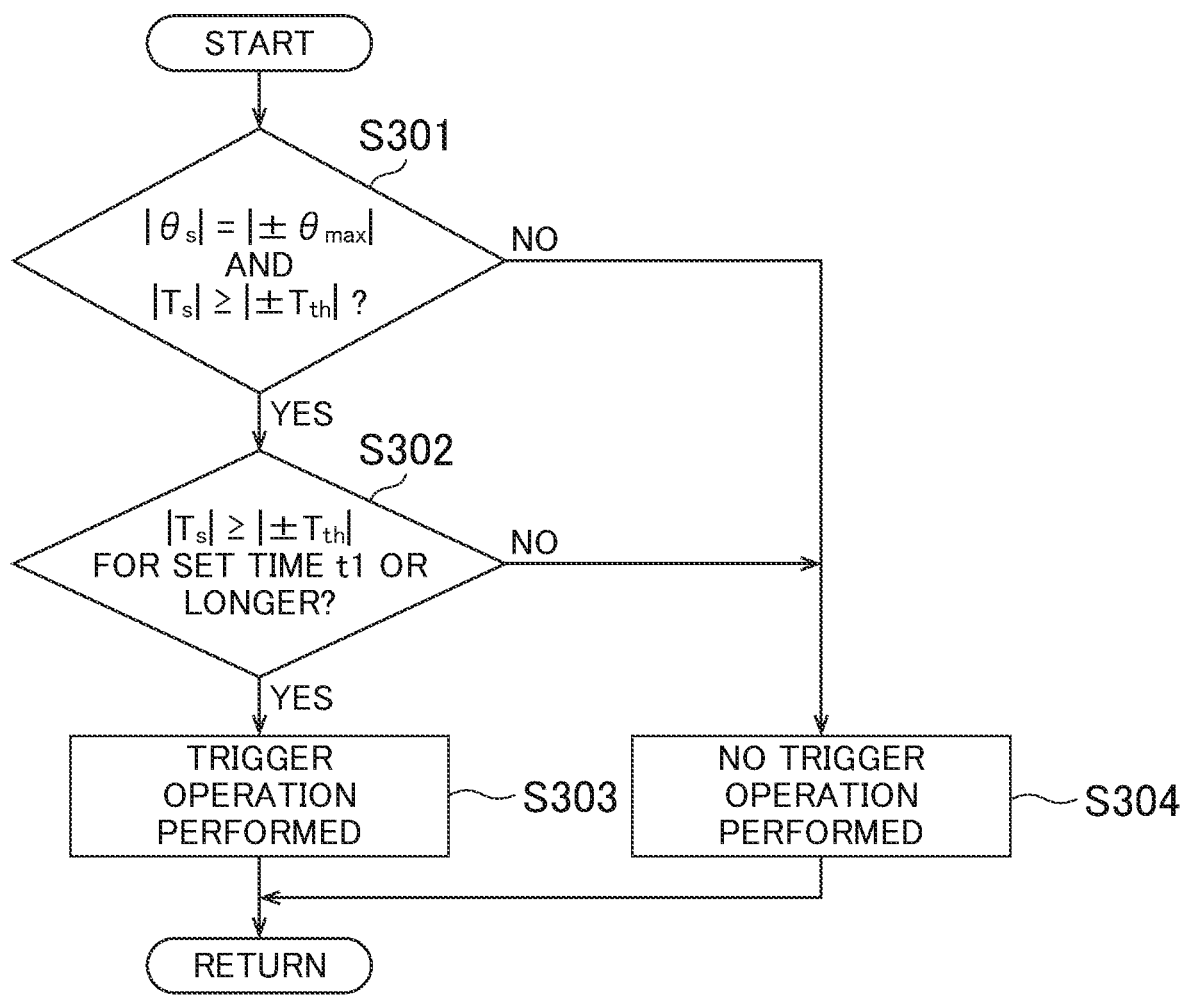
FIG. 7 is a flowchart (subroutine) of a process of determining whether a trigger operation has been performed in a second embodiment.

As shown in the flowchart of FIG. 7, the second ECU 71 determines whether the absolute value of the steering angle $\theta_s$ is equal to the absolute value of the limit steering angles $\pm\theta_{max}$ and the absolute value of the steering torque $T_s$ is equal to or larger than the absolute value of the torque thresholds $\pm T_{th}$ (step S301).

If the second ECU 71 determines that the absolute value of the steering angle $\theta_s$ is equal to the absolute value of the limit steering angles $\pm\theta_{max}$ and the absolute value of the steering torque $T_s$ is equal to or larger than the absolute value of the torque thresholds $\pm T_{th}$ (YES in step S301), the routine proceeds to step S302.

In step S302, the second ECU 71 determines whether the absolute value of the steering torque $T_s$ has been equal to or larger than the absolute value of the torque thresholds $\pm T_{th}$ for a set time t1 or longer (step S302). For example, the set time t1 is set in order to exclude the situation where the absolute value of the steering torque $T_s$ momentarily becomes equal to or larger than the absolute value of the torque thresholds $\pm\theta_{max}$, that is, in order to allow the second ECU 71 to determine that the driver has intentionally applied the steering torque $T_s$ equal to or larger than the absolute value of the torque thresholds $\pm T_{th}$ to the steering wheel 21.

Figure 8:
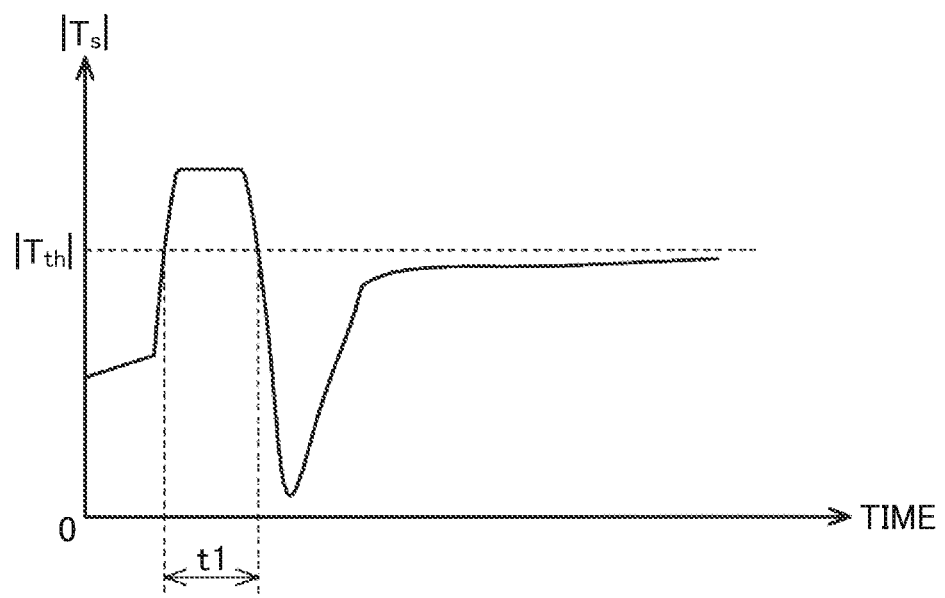
FIG. 8 is a graph showing how steering torque changes with time in the second embodiment.

As shown in the graph of FIG. 8, if the second ECU 71 determines that the absolute value of the steering torque $T_s$ has been equal to or larger than the absolute value of the torque thresholds $\pm T_{th}$ for the set time t1 or longer (YES in step S302), the routine proceeds to step S303. In step S303, the second ECU 71 confirms the determination result that a trigger operation has been performed via the steering wheel 21 and returns the confirmed determination result to the main routine shown in the flowchart of FIG. 3 (RETURN).

If the second ECU 71 determines in step S301 that at least one of the condition that the absolute value of the steering angle $\theta_s$ is equal to the absolute value of the limit steering angles $\pm\theta_{max}$ and the condition that the absolute value of the steering torque $T_s$ is equal to or larger than the absolute value of the torque thresholds $\pm T_{th}$ is not satisfied (NO in step S301), the routine proceeds to step S304. In other words, if the second ECU 71 determines in step S301 that the absolute value of the steering angle $\theta_s$ is smaller than the absolute value of the limit steering angles $\pm\theta_{max}$ or the absolute value of the steering torque $T_s$ is smaller than the absolute value of the torque thresholds $\pm T_{th}$, the routine proceeds to step S304. If the second ECU 71 determines in step S302 that the absolute value of the steering angle $\theta_s$ has not been equal to or larger than the absolute value of the torque thresholds $\pm T_{th}$ for the set time t1 or longer (NO in step S302), the routine also proceeds to step S304. In step S304, the second ECU 71 confirms the determination result that no trigger operation has been performed via the steering wheel 21 and returns the confirmed determination result to the main routine shown in the flowchart of FIG. 3 (RETURN).

Accordingly, if the driver does not want the rear part of the vehicle 10 to move outward of a turn when starting the vehicle 10, he or she can operate the steering wheel 21 as follows. As shown in the graph of FIG. 8, as a trigger operation via the steering wheel 21, the driver turns the steering wheel 21 to the limit position in its physical operation range and continuously applies the steering torque $T_s$ equal to or larger than the absolute value of the torque thresholds $\pm T_{th}$ for the set time t1 or longer. The steering control mode for the rear wheels 12$_{RR}$, 12$_{RL}$ which is performed when the vehicle speed V is in the low speed range can thus be switched from the default antiphase control to the in-phase control.

The second embodiment has the following effects in addition the effects (1) to (3) of the first embodiment.

(4) The second ECU 71 performs not only step S301 but also step S302 in the flowchart of FIG. 7 when determining whether a trigger operation has been performed by the driver. That is, a plurality of conditions is set as the conditions for determining whether a trigger operation has been performed. This can restrain unintended switching of the steering control mode for the rear wheels from the default antiphase control to the in-phase control from occurring when the driver starts the vehicle 10 etc.

(5) For example, the absolute value of the steering torque $T_s$ may momentarily become equal to or larger than the absolute value of the torque thresholds $\pm T_{th}$ for any cause. However, in the situation where the absolute value of the steering torque $T_s$ has been equal to or larger than the absolute value of the torque thresholds $\pm T_{th}$ for the set time t1 or longer as determined in step S302 of the flowchart of FIG. 7, it is highly likely that the driver has intentionally applied predetermined steering torque $T_s$ to the steering wheel 21. Unintended switching of the steering control mode for the rear wheels is therefore restrained from occurring when the driver starts the vehicle 10 etc.

A third embodiment of the four-wheel steering system will be described. The present embodiment basically has a configuration similar to that of the first embodiment shown in FIG. 1. The present embodiment is different from the first embodiment in the process of determining whether a trigger operation has been performed.

Figure 9:
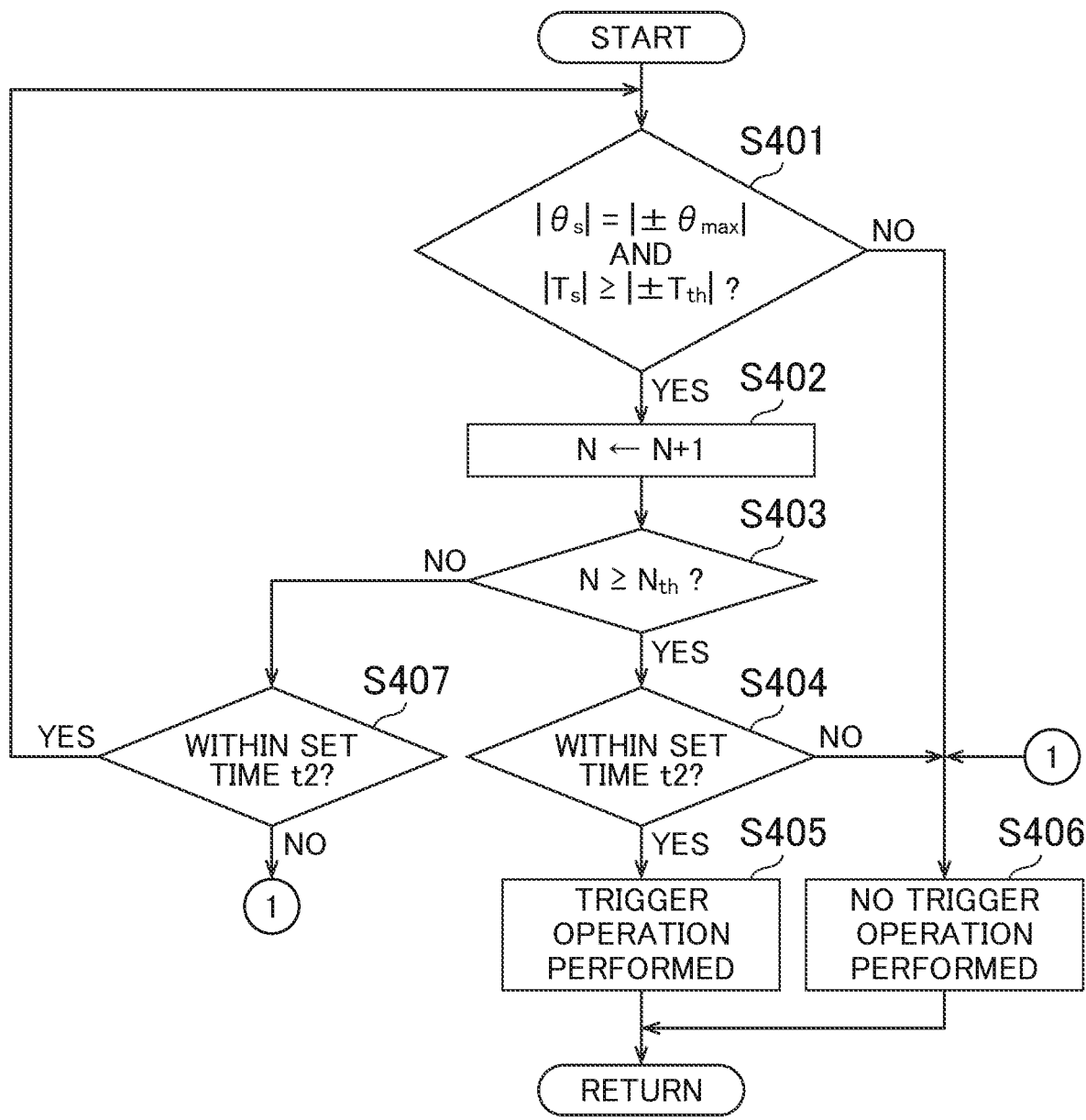
FIG. 9 is a flowchart (subroutine) of a process of determining whether a trigger operation has been performed in a third embodiment.

As shown in the flowchart of FIG. 9, the second ECU 71 determines whether the absolute value of the steering angle $\theta_s$ is equal to the absolute value of the limit steering angles $\pm\theta_{max}$ and the absolute value of the steering torque $T_s$ is equal to or larger than the absolute value of the torque thresholds $\pm T_{th}$ (step S401).

If the second ECU 71 determines that the absolute value of the steering angle $\theta_s$ is equal to the absolute value of the limit steering angles $\pm\theta_{max}$ and the absolute value of the steering torque $T_s$ is equal to or larger than the absolute value of the torque thresholds $\pm T_{th}$ (YES in step S401), the routine proceeds to step S402.

In step S402, the second ECU 71 increments a count value N. The count value N is the number of times the steering torque $T_s$ equal to or larger than the absolute value of the torque thresholds $\pm T_{th}$ has been detected. As used herein, the term "increment" means adding a predetermined number ("1" in this example) to the count value N.

The second ECU 71 then determines whether the count value N is equal to or larger than a count threshold $N_{th}$ (step S403). The count threshold $N_{th}$ is set in order to determine whether a trigger operation has been intentionally performed by the driver via the steering wheel 21. The count threshold $N_{th}$ is preferably set to 2 or more. In this example, the count threshold $N_{th}$ is set to 2.

If the second ECU 71 determines that the count value N is equal to or larger than the count threshold $N_{th}$ (YES in step S403), it determines whether it has been within a set time t2 since the first detection of the steering torque $T_s$ equal to or larger than the absolute value of the torque thresholds $\pm T_{th}$ (step S404).

If the second ECU 71 determines that it has been within the set time t2 since the first detection of the steering torque $T_s$ equal to or larger than the absolute value of the torque thresholds $\pm T_{th}$ (YES in step S404), the routine proceeds to step S405. In step S405, the second ECU 71 confirms the determination result that a trigger operation has been performed via the steering wheel 21 and returns the confirmed determination result to the main routine shown in the flowchart of FIG. 3 (RETURN).

If the second ECU 71 determines that it has not been within the set time t2 since the first detection of the steering torque $T_s$ equal to or larger than the absolute value of the torque thresholds $\pm T_{th}$ (NO in step S404), the routine proceeds to step S406. In step S406, the second ECU 71 confirms the determination result that no trigger operation has been performed via the steering wheel 21 and returns the confirmed determination result to the main routine shown in the flowchart of FIG. 3 (RETURN).

If the second ECU 71 determines in step S403 that the count value N is not equal to or larger than the count threshold $N_{th}$ (NO in step S403), it determines whether it has been within the set time t2 since the first detection of the steering torque $T_s$ equal to or larger than the absolute value of the torque thresholds $\pm T_{th}$ (step S407). If the second ECU 71 determines in step S407 that it has been within the set time t2 since the first detection of the steering torque $T_s$ equal to or larger than the absolute value of the torque thresholds $\pm T_{th}$ (YES in step S407), the routine proceeds to step S401.

If the second ECU 71 determines in step S407 that it has not been within the set time t2 since the first detection of the steering torque $T_s$ equal to or larger than the absolute value of the torque thresholds $\pm T_{th}$ (NO in step S407), the routine proceeds to step S406. If the second ECU 71 determines in step S401 that at least one of the condition that the absolute value of the steering angle $\theta_s$ is equal to the absolute value of the limit steering angles $\pm\theta_{max}$ and the condition that the absolute value of the steering torque $T_s$ is equal to or larger than the absolute value of the torque thresholds $\pm T_{th}$ is not satisfied (NO in step S401), the routine also proceeds to step S406.

Figure 10:
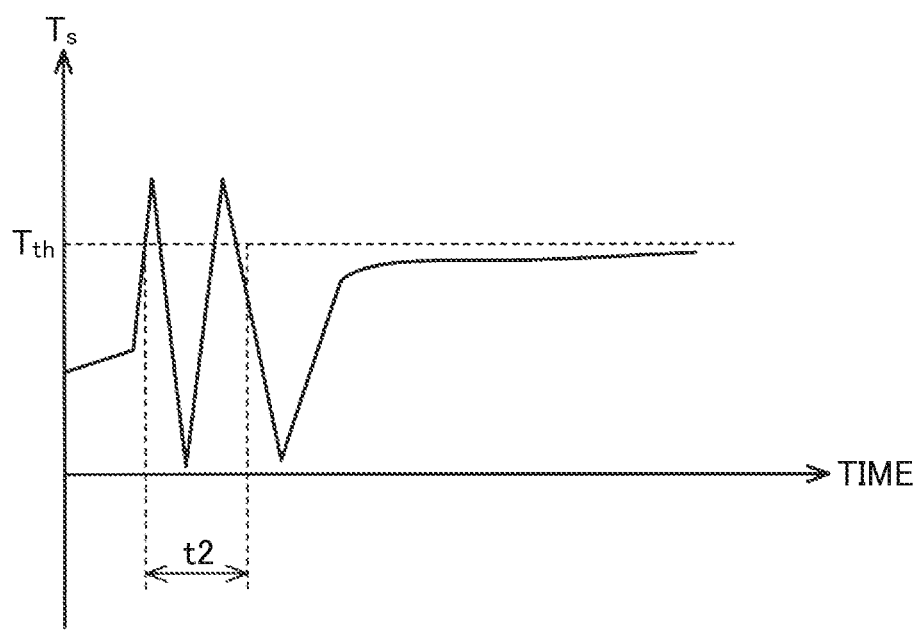
FIG. 10 is a graph showing how steering torque changes with time in the third embodiment.

Accordingly, if the driver does not want the rear part of the vehicle 10 to move outward of a turn when starting the vehicle 10, he or she performs a trigger operation via the steering wheel 21 by applying the steering torque $T_s$ equal to or larger than the absolute value of the torque thresholds $\pm T_{th}$ to the steering wheel 21 the number of times equal to or larger than the count threshold $N_{th}$ within the set time t2, as shown in the graph of FIG. 10. The steering control mode for the rear wheels $12_{RR}$, $12_{RL}$ to be performed when the vehicle speed V is in the low speed range can thus be switched from the default antiphase control to the in-phase control.

In order to change the steering torque $T_s$ with time in a manner shown in the graph of FIG. 10, the driver can operate the steering wheel 21 as follows. The driver turns the steering wheel 21 to the limit position in its physical operation range and further applies the steering torque $T_s$ to the steering wheel 21 in such a direction that the absolute value of the steering angle $\theta_s$ increases (hereinafter this operation is referred to as the first operation). Immediately thereafter, the driver turns the steering wheel 21 back in such a direction that the absolute value of the steering angle $\theta_s$ decreases (hereinafter this operation is referred to as the second operation). It is herein assumed that the steering wheel 21 is turned back by, e.g., about an amount corresponding to the torsion of a torsion bar, not shown, which forms the torque sensor. Immediately thereafter, the first operation and the second operation are repeated once. Only two pulses of the steering torque $T_s$ which are equal to or larger than the absolute value of the torque thresholds $\pm T_{th}$ can thus be generated within the set time t2.

The third embodiment has the following effect in addition to the effects (1) to (3) of the first embodiment.

(6) The absolute value of the steering torque $T_s$ may momentarily become equal to or larger than the absolute value of the torque thresholds $\pm T_{th}$ for any cause. Accordingly, if only step S201 in the flowchart of FIG. 4 is performed to determine whether a trigger operation has been performed, it may be erroneously determined that a trigger operation has been performed. In the third embodiment, whether the steering torque $T_s$ equal to or larger than the absolute value of the torque thresholds $\pm T_{th}$ has been detected a plurality of times within the set time t2 as shown in the graph of FIG. 10 is set as a condition for determining whether a trigger operation has been performed. Whether a trigger operation has been performed or not can therefore be more accurately determined. This can restrain unintended switching of the steering control mode for the rear wheels from the default antiphase control to the in-phase control from occurring when the driver starts the vehicle 10 etc.

A fourth embodiment of the four-wheel steering system will be described. The present embodiment basically has a configuration similar to that of the first embodiment shown in FIG. 1. The present embodiment is different from the first embodiment in that the main routine of the process of switching the steering control mode for the rear wheels includes the step of returning the steering control mode for the rear wheels to the antiphase control after switching the steering control mode for the rear wheels from the default antiphase control to the in-phase control. The present embodiment is applicable to any of the first to third embodiments.

Figure 11:
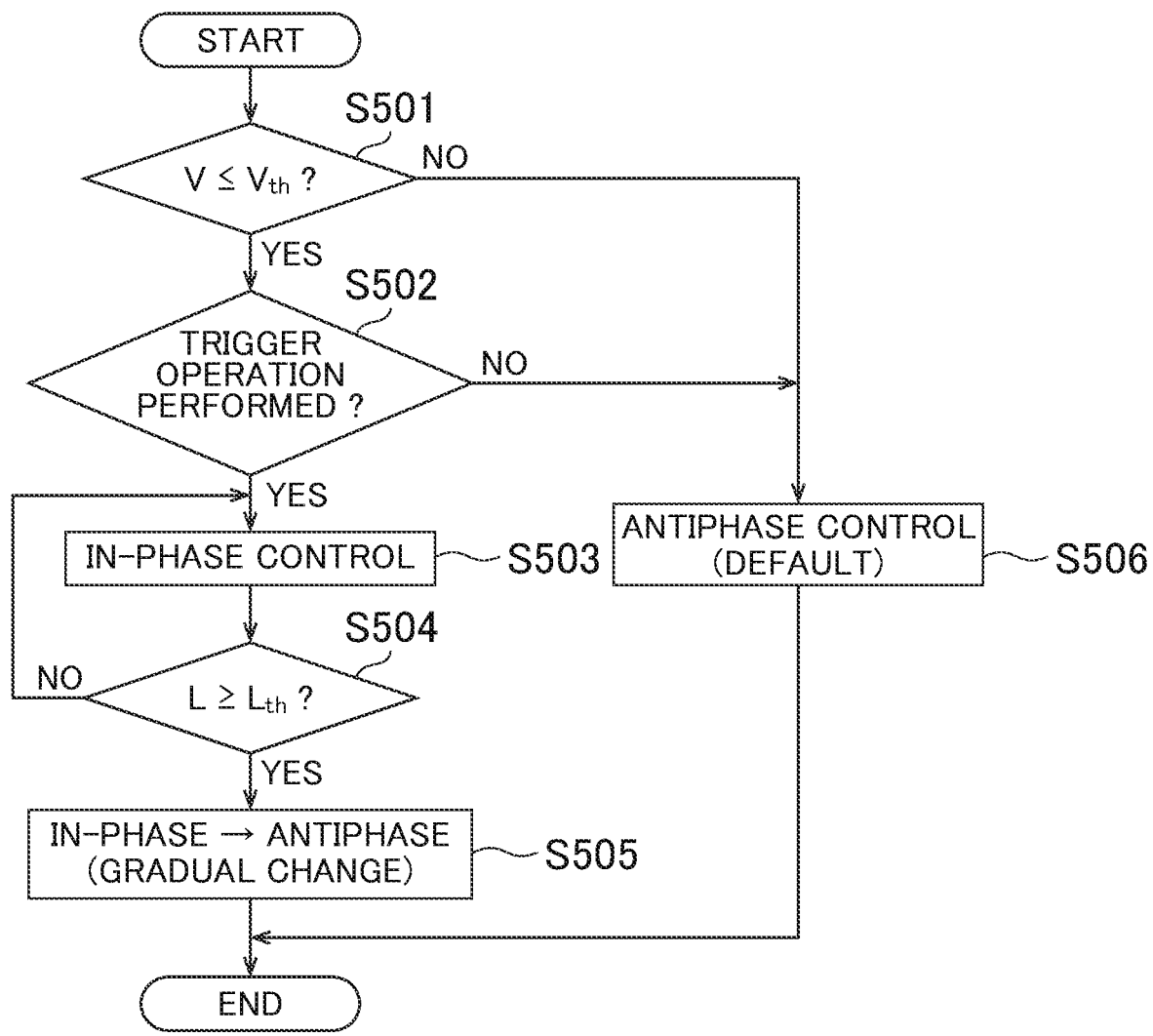
FIG. 11 is a flowchart (main routine) of a process of switching a steering control mode for rear wheels when a vehicle moves at low speeds in a fourth embodiment.

As shown in the flowchart of FIG. 11, the second ECU 71 determines whether the vehicle speed V is equal to or lower than the vehicle speed threshold $V_{th}$ (step S501). If the second ECU 71 determines that the vehicle speed V is equal to or lower than the vehicle speed threshold $V_{th}$ (YES in step S501), the routine proceeds to step S502.

In step S502, the second ECU 71 determines whether a trigger operation has been performed via the steering wheel 21. If the second ECU 71 determines that a trigger operation has been performed via the steering wheel 21 (YES in step S502), it performs the in-phase control of the rear wheels $12_{RR}$, $12_{RL}$ instead of the antiphase control of the rear wheels $12_{RR}$, $12_{RL}$ which is set as a default control mode for low vehicle speeds (step S503).

The second ECU 71 then determines whether the distance L by which the vehicle 10 has moved in the lateral direction of the vehicle 10 is equal to or larger than a distance threshold $L_{th}$ (step S504). For example, the second ECU 71 calculates the distance L based on the steering angle $\theta_s$ and the vehicle speed V. The second ECU 71 may calculate the distance L based on the steering angle $\theta_s$ and the rotation angle of the front wheels $12_{FR}$, $12_{FL}$ or the rotation angle of the rear wheels $12_{RR}$, $12_{RL}$. The rotation angle of the front wheels $12_{FR}$, $12_{FL}$ or the rear wheels $12_{RR}$, $12_{RL}$ is calculated based on an electrical signal (vehicle speed signal) that is generated by the vehicle speed sensor 42.

If the second ECU 71 determines that the distance L is equal to or larger than the distance threshold $L_{th}$ (YES in step S504), it returns the steering control mode for the rear wheels from the in-phase control to the default antiphase control (step S505). It is herein assumed that the vehicle speed V is still equal to or lower than the vehicle speed threshold $V_{th}$. At this time, the second ECU 71 gradually changes the steered angle $\theta_{WT}$ of the rear wheels $12_{RR}$, $12_{RL}$ from an angle in the same direction as that of the front wheels $12_{FR}$, $12_{FL}$ to an angle in the opposite direction to that of the front wheels $12_{FR}$, $12_{FL}$.

If the second ECU 71 determines in step S504 that the distance L is not equal to or larger than the distance threshold $L_{th}$ (NO in step S504), the routine proceeds to step S503, where the second ECU 71 continues to perform the in-phase control of the rear wheels $12_{RR}$, $12_{RL}$. If the second ECU 71 determines in step S501 that the vehicle speed V is not equal to or lower than the vehicle speed threshold $V_{th}$ (NO in step S501), it performs the antiphase control of the rear wheels $12_{RR}$, $12_{RL}$ which is set as a default control mode for low vehicle speeds (step S506). If the second ECU 71 determines in step S502 that no trigger operation has been performed via the steering wheel 21 (NO in step S502), it also performs the antiphase control of the rear wheels $12_{RR}$, $12_{RL}$ (step S506).

Figure 12:
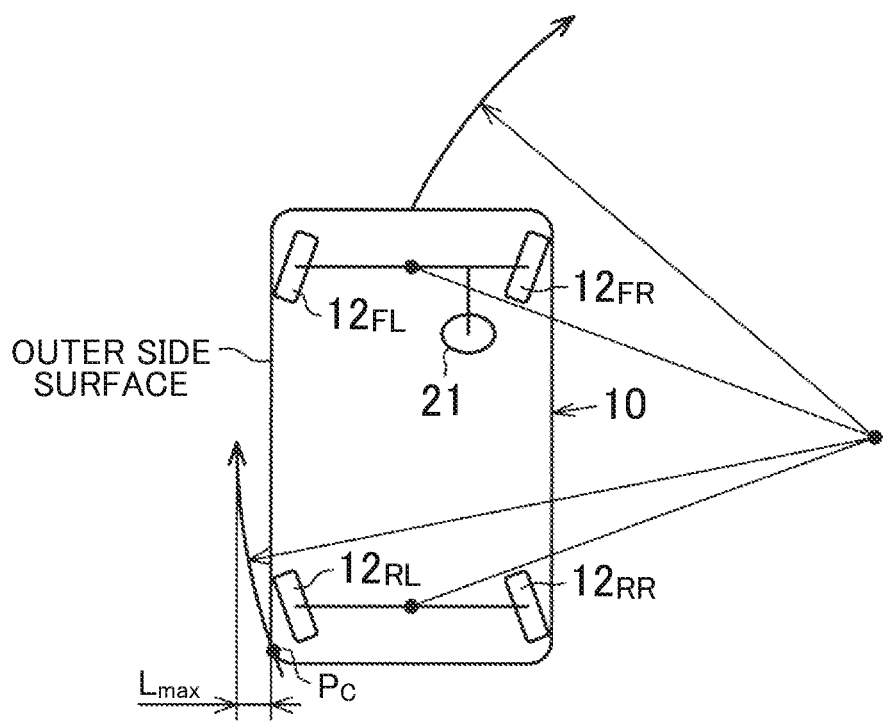
FIG. 12 is a plan view of a vehicle showing the amount by which the rear part of a vehicle moves outward of a turn when the vehicle starts to move in the fourth embodiment.

A method for setting the distance threshold $L_{th}$ will be described. As shown in FIG. 12, when the vehicle 10 turns in the low speed range, the rear wheels $12_{RR}$, $12_{RL}$ are steered in the opposite direction to that in which the front wheels $12_{FR}$, $12_{FL}$ are steered. The corner Pc of the rear end of the vehicle 10 therefore moves greatly outward of the turn. It is herein assumed that the rear wheels $12_{RR}$, $12_{RL}$ are steered by a maximum allowable steered angle and the corner Pc moves outward of the turn to the largest extent. In this case, the corner Pc moves in the lateral direction of the vehicle 10 (the horizontal direction in FIG. 12) by a distance $L_{max}$ with respect to an outer side surface of the vehicle 10 which is an outer side surface in the case where the direction in which the rear wheels $12_{RR}$, $12_{RL}$ are steered is kept in such a direction that the vehicle 10 moves straight. In view of this, the distance threshold $L_{th}$ is set to a value equal to or larger than the distance $L_{max}$. The distance $L_{max}$ is the maximum amount by which the corner Pc of the rear end of the vehicle 10 moves outward of the turn.

Figure 13A:
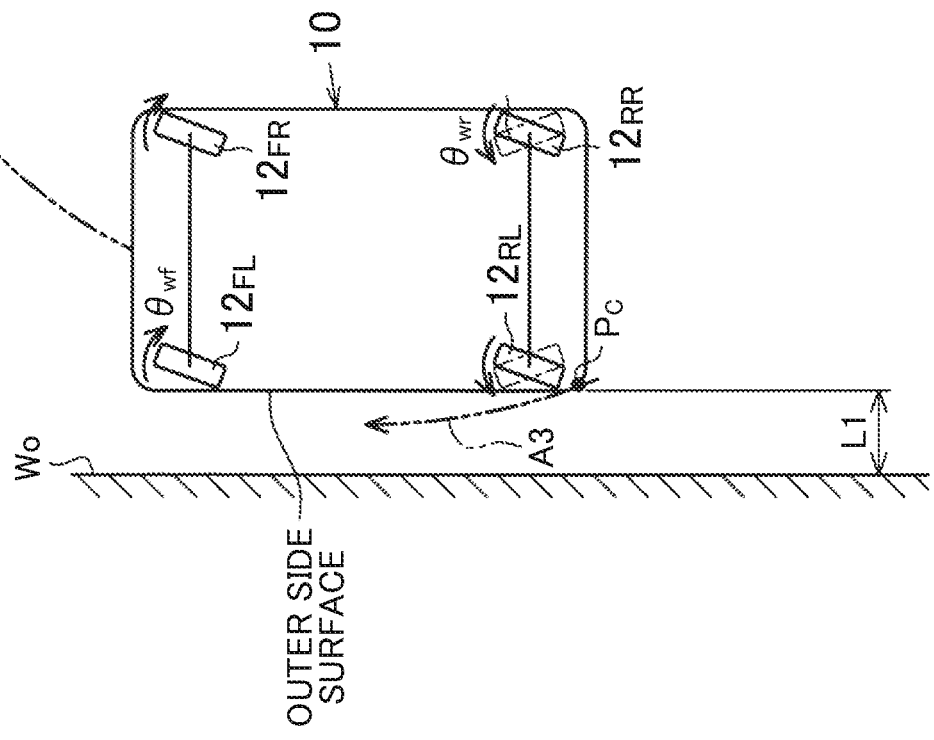
FIG. 13A is a plan view showing turning characteristics at the time a vehicle starts to move in the fourth embodiment.

Functions that are obtained by switching the steering control mode for the rear wheels $12_{RR}$, $12_{RL}$ will be described. It is herein assumed that the vehicle 10 has been parked along an obstacle Wo such as a wall at a distance a from the obstacle Wo, as shown in FIG. 13A. The distance a is shorter than the maximum distance $L_{max}$ by which the corner Pc can move in the lateral direction of the vehicle 10 when the antiphase control of the rear wheels $12_{RR}$, $12_{RL}$ is performed. In this situation, the driver performs by his/her own decision a specific trigger operation via the steering wheel 21 when starting the parked vehicle 10, whereby the steering control mode for the rear wheels is switched from the default antiphase control to the in-phase control.

As a result, as shown by arrow D2 in FIG. 13A, the vehicle 10 moves obliquely forward so as to move away from the obstacle Wo in accordance with the steered angle $\theta_{wf}$ of the front wheels $12_{FR}$, $12_{FL}$ and the steered angle $\theta_{WT}$ of the rear wheels $12_{RR}$, $12_{RL}$. Since the vehicle 10 moves without turning, the corner Pc of the rear end of the vehicle 10 does not move outward of the turn. The corner Pc of the rear end of the vehicle 10 is thus restrained from contacting the obstacle Wo when the driver starts the vehicle 10.

At the time the distance L by which the vehicle 10 has moved in the lateral direction of the vehicle 10 (the horizontal direction in FIG. 13A) becomes equal to the distance threshold $L_{th}$ as shown by long dashed double-short dashed lines in FIG. 13A, the steering control mode for the rear wheels is returned from the in-phase control to the default antiphase control.

Figure 13B:
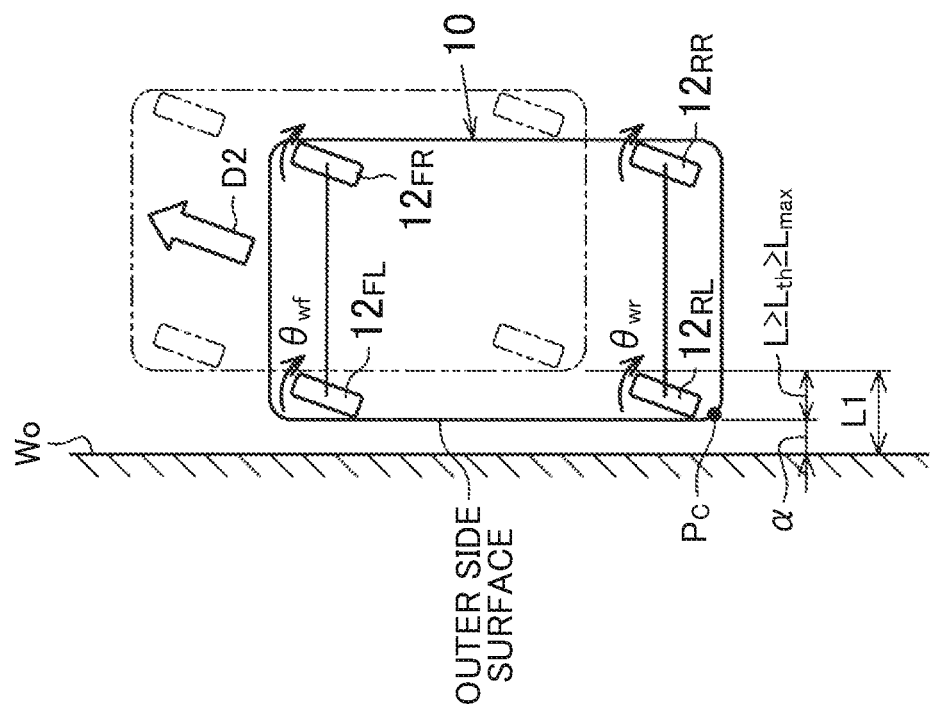
FIG. 13B is a plan view showing turning characteristics at the time the vehicle starts turning in the fourth embodiment.

As shown by long dashed double-short dashed lines in FIG. 13B, the vehicle 10 then starts turning along a path in the direction in which the rear wheels $12_{RR}$, $12_{RL}$ are steered, namely in the opposite direction to that in which the front wheels $12_{FR}$, $12_{FL}$ are steered. As shown by arrow A3 in FIG. 13B, as the vehicle 10 turns, the corner Pc of the rear end of the vehicle 10 moves outward of the turn with respect to an outer side surface of the vehicle 10 which is an outer side surface in the case where the vehicle 10 is moving straight. The corner Pc thus gradually approaches the obstacle Wo.

As shown by the long dashed double-short dashed lines in FIG. 13A, at the time the vehicle 10 starts turning, the distance between the outer side surface of the vehicle 10 and the obstacle Wo is equal to the distance L1 that is the sum of the distance a between the parked vehicle 10 and the obstacle Wo and the distance L ($\geq L_{th}$) by which the vehicle 10 has moved with the rear wheels $12_{RR}$, $12_{RL}$ being steered in phase with the front wheels $12_{FR}$, $12_{FL}$. The distance L1 is longer than the maximum distance $L_{max}$ by which the corner Pc can move in the lateral direction of the vehicle 10 when the antiphase control of the rear wheels $12_{RR}$, $12_{RL}$ is performed. Accordingly, as shown by the long dashed double-short dashed lines in FIG. 13B, even if the vehicle 10 starts turning with the rear wheels $12_{RR}$, $12_{RL}$ being steered in the opposite direction to that in which the front wheels $12_{FR}$, $12_{FL}$ are steered, the corner Pc of the rear end of the vehicle 10 will not contact the obstacle Wo.

The fourth embodiment has the following effects in addition to the effects (1) to (3) of the first embodiment.

(7) When the vehicle 10 starts to move, the steering control mode for the rear wheels may be switched from the default antiphase control to the in-phase control in response to driver's trigger operation. In this case, the steering control mode for the rear wheels is returned from the in-phase control to the antiphase control when the vehicle 10 has moved in the lateral direction of the vehicle 10 by the distance (distance L) large enough that the corner Pc of the rear end of the vehicle 10 will not interfere with the obstacle Wo such as a wall even if the steering control mode for the rear wheels is returned from the in-phase control to the antiphase control. This provides the vehicle 10 with turning capability while avoiding contact between the vehicle 10 and the obstacle Wo when the vehicle 10 parked along the obstacle Wo such as a wall starts to move.

(8) When the steering control mode for the rear wheels is returned from the in-phase control to the default antiphase control, the steered angle $\theta_{WT}$ of the rear wheels $12_{RR}$, $12_{RL}$ is gradually changed from in-phase to antiphase. This restrains a rapid change in vehicle behavior. The driver is therefore less likely to get an uncomfortable driving feel.

The above embodiments may be modified as follows.

In the first to fourth embodiments, the second ECU 71 detects the steering angle $\theta_s$ via the steering angle sensor 44. However, the steering angle $\theta_s$ may be calculated based on the rotation angle $\theta_{mf}$ of the motor 31 which is detected by the rotation angle sensor 45. The motor 31 is coupled to the steering shaft 22 via the reduction gear mechanism 32, the pinion shaft 33, and the steered shaft 23. Accordingly, there is a correlation between the rotation angle $\theta_{mf}$ of the motor 31 and the steering angle $\theta_s$. The steering angle $\theta_s$ can therefore be calculated from the rotation angle $\theta_{mf}$ of the motor 31. With this configuration, the invention can also be suitably applied to a vehicle 10 that is not equipped with the steering angle sensor 44, depending on the specifications of the vehicle 10 etc.

In the first to fourth embodiments, in the case where the steering control mode for the rear wheels $12_{RR}$, $12_{RL}$ is switched from the default antiphase control to the in-phase control in response to driver's trigger operation when the vehicle 10 starts to move, the steered angle $\theta_{WT}$ of the rear wheels $12_{RR}$, $12_{RL}$ in accordance with the steering angle $\theta_s$ may be determined in accordance with the steering torque $T_s$. For example, the steered angle $\theta_{WT}$ of the rear wheels $12_{RR}$, $12_{RL}$ in accordance with the steering angle $\theta_s$ is set to a larger value as the absolute value of the steering torque $T_s$ increases. The steering torque $T_s$ herein refers to the steering torque $T_s$ that is applied when the driver performs a trigger operation via the steering wheel 21, namely when the steering wheel 21 turned to the limit position in its physical operation range is further turned in such a direction that the absolute value of the steering angle $\theta_s$ increases.

The vehicle 10 can thus respond to the driver's intention to more quickly move away from the obstacle Wo such as a wall. This is based on the fact that the larger the absolute value of the steering torque $T_s$ is, the stronger the driver's intention to more quickly move away from the obstacle Wo such as a wall is. In the case where the rear wheels $12_{RR}$, $12_{RL}$ are steered in phase with the front wheels $12_{FR}$, $12_{FL}$, the amount by which the vehicle 10 moves in the lateral direction of the vehicle 10 (in this example, the direction away from the obstacle Wo) increases with an increase in steered angle $\theta_{WT}$ of the rear wheels $12_{RR}$, $12_{RL}$.

In the first to fourth embodiments, the process of determining whether the absolute value of the steering angle $\theta_s$ is equal to the absolute value of the limit steering angles $\pm\theta_{max}$ may be omitted in step S201 of FIG. 4, step S301 of FIG. 7, and step S401 of FIG. 9. This is for the following reason. The torque thresholds $\pm T_{th}$ are set based on the steering torque $T_s$ that is applied when the steering wheel 21 turned until the absolute value of the steering angle $\theta_s$ becomes equal to the absolute value of the limit steering angles $\pm\theta_{max}$ is further turned by the driver by a predetermined amount in such a direction that the absolute value of the steering angle $\theta_s$ increases. Accordingly, the absolute value of the steering torque $T_s$ basically becomes equal to or larger than the absolute value of the torque thresholds $\pm T_{th}$ only when the steering wheel 21 is turned to the limit position in its physical operation range, namely only when the absolute value of the steering angle $\theta_s$ is equal to the absolute value of the limit steering angles $\pm \theta_{max}$.

In the first to fourth embodiments, the front-wheel steering system 13 is configured to apply torque of the motor 31 to the steered shaft 23. However, for example, the front-wheel steering system 13 may be configured to apply torque of the motor 31 to the steering shaft 22 (the column shaft 25).

In the first to fourth embodiments, the front-wheel steering system 13 is configured to assist in steering by applying torque of the motor 31 to the steered shaft 23. However, the configuration that assists in steering may be omitted depending on the specifications of the vehicle 10 etc. In this case, the front wheels 12$_{FR}$, 12$_{FL}$ are steered only by the driver's steering operation.

What is claimed is:

1. A four-wheel steering system comprising:
a front-wheel steering system that steers front wheels of a vehicle; and
a rear-wheel steering system that steers rear wheels of the vehicle in accordance with a steering angle that is a rotation angle of a steering wheel, the rear-wheel steering system including a control device that includes a processor configured to, when a vehicle speed is equal to or lower than a vehicle speed threshold:
perform an antiphase control in which the rear-wheel steering system steers the rear wheels in an opposite direction to a direction in which the front-wheel steering system steers the front wheels, and
in response to a specific trigger operation that is performed via the steering wheel, which includes at least an absolute value of a steering torque applied to the steering wheel being equal to or greater than a torque threshold, perform in-phase control in which the rear-wheel steering system steers the rear wheels in the same direction as the direction in which the front-wheel steering system steers the front wheels, wherein:

the torque threshold is set based on the steering torque that is applied to the steering wheel when the steering wheel, which was located at a set rotational limit position in a physical operation range of rotation of the steering wheel, is further rotated in such a direction that an absolute value of the steering angle increases;

when the in-phase control is being performed in response to the specific trigger operation, the control device switches a steering control mode for the rear wheels from the in-phase control to the antiphase control in response to determining that a distance by which the vehicle has moved in a lateral direction of the vehicle is equal to or larger than a distance threshold; and the distance threshold is set based on a maximum amount by which a corner of a rear end of the vehicle moves outward of a turn when the antiphase control is performed.

2. The four-wheel steering system according to claim 1, wherein, when the vehicle speed is equal to or lower than the vehicle speed threshold, the control device determines that the specific trigger operation has been performed when the absolute value of the steering torque has been equal to or larger than the torque threshold for a first set time or longer.

3. The four-wheel steering system according to claim 1, wherein, when the vehicle speed is equal to or lower than the vehicle speed threshold, the control device determines that the specific trigger operation has been performed when the steering torque equal to or larger than the torque threshold is detected a set number of times within a set time.

* * * * *